US012512634B2

(12) United States Patent
Wild

(10) Patent No.: US 12,512,634 B2
(45) Date of Patent: Dec. 30, 2025

(54) ELECTRICAL PLUG CONNECTOR, ELECTRICAL MATING PLUG CONNECTOR, AND ELECTRICAL PLUG CONNECTION

(71) Applicant: Rosenberger Hochfrequenztechnik GmbH & Co. KG, Fridolfing (DE)

(72) Inventor: Werner Wild, Buttenwiesen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 408 days.

(21) Appl. No.: 18/075,780

(22) Filed: Dec. 6, 2022

(65) Prior Publication Data

US 2023/0178944 A1 Jun. 8, 2023

(30) Foreign Application Priority Data

Dec. 6, 2021 (EP) .................................... 21212536

(51) Int. Cl.
*H01R 24/44* (2011.01)
*H01R 13/719* (2011.01)
*H01R 103/00* (2006.01)

(52) U.S. Cl.
CPC ........... *H01R 24/44* (2013.01); *H01R 13/719* (2013.01); *H01R 2103/00* (2013.01)

(58) Field of Classification Search
CPC ...... H01R 24/44; H01R 24/38; H01R 13/719; H01R 2103/00
USPC ......................................................... 439/578
See application file for complete search history.

(56) References Cited

U.S. PATENT DOCUMENTS 4,333,697 A 6/1982 Dreyer
6,778,044 B2 * 8/2004 Fehrenbach ......... H01R 13/025 333/260
8,496,495 B2 * 7/2013 Kari ....................... H01R 24/40 439/352

(Continued)

OTHER PUBLICATIONS

European Search Report dated May 24, 2022.
Office Action issued by the European Patent Office dated Nov. 5, 2024.

*Primary Examiner* — Gary F Paumen
(74) *Attorney, Agent, or Firm* — Randall Danskin P.S.

(57) ABSTRACT

An plug connector for electrical and mechanical connection to a mating plug connector has an outer conductor contact element and an inner conductor contact element. The inner conductor contact element has an inner-conductor-side contact region and the outer conductor contact element has an outer-conductor-side contact region. An inner-conductor-side contact plane is spanned by contact points of the inner-conductor-side contact region to contact a corresponding contact point of an inner conductor mating contact element. An outer-conductor-side contact plane is defined by contact points to contact a corresponding contact point of an outer conductor mating contact element. The inner-conductor-side contact plane and the outer-conductor-side contact plane are spaced apart in such a way that, in a plugged state of the plug connector and the mating plug connector, compensation of an electrical signal reflected in the inner-conductor-side contact plane by an electrical signal reflected in outer-conductor-side contact plane is attainable.

8 Claims, 7 Drawing Sheets

(56) References Cited

U.S. PATENT DOCUMENTS

| | | | | |
|---|---|---|---|---|
| 8,574,006 | B2 * | 11/2013 | Gilliam ................ | H01R 9/0521<br>439/607.41 |
| 2003/0137372 | A1 | 7/2003 | Fehrenbach | |
| 2020/0091658 | A1 * | 3/2020 | Van Swearingen .... | H01R 24/38 |

* cited by examiner

ELECTRICAL PLUG CONNECTOR, ELECTRICAL MATING PLUG CONNECTOR, AND ELECTRICAL PLUG CONNECTION

CROSS-REFERENCE TO RELATED APPLICATIONS

This US National Stage Non-Provisional patent application claims priority to earlier filed European Patent Application No. 21 212 536.3 which was filed on 6 Dec. 2021.

The entire contents of the aforementioned earlier filed European Application is expressly and fully incorporated herein by this reference.

Pursuant to USPTO rules, this priority claim to earlier filed European Patent Application No. 21 212 536.3, which was filed on 6 Dec. 2021, is also included in the Application Data Sheet (ADS) filed herewith.

FIELD OF INVENTION

The present invention relates to an electrical plug connector. The present invention additionally relates to an electrical mating plug connector. The present invention lastly relates to an electrical plug connection.

BACKGROUND OF THE INVENTION

Electrical plug connectors are used in particular for the transmission of data signals and supply voltages to corresponding mating plug connectors. If a high data volume has to be transmitted in a data signal, the data to be transmitted are modulated onto a high-frequency carrier signal. Electrical high-frequency plug connectors have become established for the transmission of a high-frequency signal of this kind.

An electrical high-frequency plug connection is distinguished above all by good electrical transmission properties, the simplest possible plugging and release of the connection, good shielding of electromagnetic fields, and a connection with minimal reflection between two high-frequency lines each having an identical wave impedance.

The electrical contacting between inner or outer conductor contact elements of the electrical plug connector, and of the electrical mating plug connector is achieved, in the case of the most frequently used electrical plug connection, specifically a polarized electrical plug connection, by means of a pin-and-socket contact, or a socket-and-socket contact. The pin-and-socket, or socket-and-socket, contacting is associated with a functional change in diameter between the two contact parts and thus with an inner- and outer-conductor-side point of discontinuity in the transmission path.

In the case of the non-polarized electrical plug connection, in which at least the inner-conductor-side contacting is achieved by means of an end contact, there may be a point of discontinuity in the transmission path, at least on the inner conductor side, due to a radial offset between the electrical plug connector and the electrical mating plug connector.

Each inner-conductor-side and/or outer-conductor-side point of discontinuity within the electrical plug connection disadvantageously results in a reflection of the high-frequency signal to be transmitted by means of the electrical plug connection and thus disadvantageously worsens the high-frequency transmission property of the electrical high-frequency plug connector.

This is a condition that requires improvement.

Against this background, an object of the present invention is to describe an electrical high-frequency plug connection which is optimized in respect of its high-frequency transmission behavior.

In accordance with the invention, this object is achieved by an electrical plug connector and by an electrical mating plug connector.

An electrical plug connector for electrical and mechanical connection to an electrical mating plug connector, comprising at least one inner conductor contact element and one outer conductor contact element, through which the inner conductor contact element extends at least in some portions, wherein the inner conductor contact element comprises an inner-conductor-side contact region and the outer conductor contact element comprises an outer-conductor-side contact region, wherein an inner-conductor-side contact plane oriented transversely (in particular orthogonally or perpendicularly or at least substantially orthogonally or substantially perpendicularly) to the plug-in direction is spanned by contact points of the inner-conductor-side contact region which are each configured to contact a corresponding contact point of an inner conductor mating contact element of the mating plug connector, and an outer-conductor-side contact plane oriented transversely (in particular orthogonally or perpendicularly or at least substantially orthogonally or substantially perpendicularly) to the plug-in direction is spanned by contact points of the outer-conductor-side contact region which are each configured to contact a corresponding contact point of an outer conductor mating contact element of the mating plug connector, wherein the inner-conductor-side contact plane and the outer-conductor-side contact plane are spaced apart from one another in the plug-in direction, or axially, in such a way that, in a plugged state of the plug connector and of the mating plug connector, a compensation of an electrical signal reflected in the inner-conductor-side contact plane by an electrical signal reflected in the outer-conductor-side contact plane is attainable.

An electrical mating plug connector for electrical and mechanical connection to an electrical plug connector, comprising at least one inner conductor contact element and one outer conductor contact element, through which the inner conductor contact element extends at least in some portions, wherein the inner conductor mating contact element comprises an inner-conductor-side mating contact region and the outer conductor mating contact element comprises an outer-conductor-side mating contact region, wherein an inner-conductor-side contact plane oriented transversely (in particular orthogonally or perpendicularly or at least substantially orthogonally or substantially perpendicularly) to the plug-in direction is spanned by contact points of the inner-conductor-side mating contact region which are each configured to contact a corresponding contact point of an inner conductor contact element of the plug connector, and an outer-conductor-side contact plane oriented transversely (in particular orthogonally or perpendicularly or at least substantially orthogonally or substantially perpendicularly) to the plug-in direction is spanned by contact points of the outer-conductor-side mating contact region which are each configured to contact a corresponding contact point of an outer conductor contact element of the electrical plug connector, wherein the inner-conductor-side contact plane and the outer-conductor-side contact plane are spaced apart from one another in the plug-in direction or axially in such a way that, in a plugged state of the electrical plug connector and of the electrical mating plug connector, a compensation of an electrical signal reflected in the inner-conductor-side contact plane by an electrical signal reflected in the outer-conductor-side contact plane is attainable.

The contact points spanning a contact plane are preferably distributed in each case in a manner running in the circumferential direction of the contact element in question, particularly preferably distributed over a common circular line. However, the contact points can also be distributed on a common end face of the contact element in question, in particular on an annular end face.

An area vector or normal vector of the stated contact planes is preferably oriented in each case parallel to the plug-in direction.

The finding/concept forming the basis of the present invention lies in positioning the inner-conductor-side contact plane and the outer-conductor-side contact plane between the electrical plug connector and the electrical mating plug connector axially relative to one another in such a way that the high-frequency signal reflected in the inner-conductor-side contact plane and the high-frequency signal reflected in the outer-conductor-side contact plane each have a phase shift in relation to one another, such that a superimposition of the two reflected high-frequency signals phase-shifted in relation to one another leads, in an ideal case, to complete mutual compensation.

In an ideal case of complete mutual compensation, a reflection of the high-frequency signal in the electrical plug connection is thus prevented. The signal energy of the high-frequency signal therefore is not reduced in the transmission direction. Since the axial positioning of the external-conductor-side contact plane and the inner-conductor-side contact plane relative to one another is identical in both transmission directions of the high-frequency signal, a complete compensation of the two reflected high-frequency signals can be realized in both transmission directions.

Here and hereinafter, a contact plane is understood to mean a plane that is oriented preferably orthogonally to the longitudinal axis of the electrical plug connection. In the case of radial contacting, the contact plane is spanned by the individual common contact points of the contact region in question, where the inner conductor contact element and the associated inner conductor mating contact element or the outer conductor contact element and the associated outer conductor mating contact element contact one another in the plugged state of the electrical plug connection. In the case of radial contacting, these common contact points preferably lie on a circular line which is preferably oriented coaxially to the longitudinal axis of the electrical plug connection. In the case of physical end contacting, there is likewise inner- or outer-conductor-side contacting by means of a plurality of contact points in each case. These common contact points, in the case of outer conductor contacting, preferably lie within an annular area (and thus also on at least one circular line) and, in the case of inner conductor contacting, within a circular area or within an annular area. The annular area or the circular area is preferably oriented orthogonally to the longitudinal axis of the electrical plug connection.

Whereas the contact plane contains at least three, but preferably the sum of all contact points between the two contact partners in the plugged state of the electrical plug connection, the contact region of a contact element in the case of radial contacting is the outer lateral surface of a contact element in the form of a pin, the outer or inner lateral surface of a contact element in the form of a socket, or the contact points of all spring lugs of a contact element formed as a spring contact sleeve and, in the case of end contacting, the end face of a contact element.

The inner-conductor-side/outer-conductor-side contact region and/or the inner-conductor-side/outer-conductor-side mating contact region may optionally have an axial extent or an extent in the plug-in direction. In particular, it can be provided that all contact regions of the plug connector have no axial extent and all mating contact regions of the mating plug connector have an axial extent—or vice versa. A mixed variant, in which for example the inner-conductor-side contact region has no axial extent and the inner-conductor-side mating contact region has an axial extent, and the outer-conductor-side contact region has an axial extent and the outer-conductor-side mating contact region has no axial extent, can also be provided (or vice versa). If at least one of the contact partners has a contact region or mating contact region with an axial extent, tolerances in the plug-in direction can be compensated particularly well.

A plugged state of the electrical plug connector and of the electrical mating plug connector will be understood hereinafter to mean a state in which a contact region of the inner conductor contact element of the electrical plug connector electrically contacts a mating contact region of the inner conductor mating contact element of the electrical mating plug connector and a contact region of the outer conductor contact element of the electrical plug connector electrically contacts a mating contact region of the outer conductor mating contact element of the electrical mating plug connector.

The electrical plug connector and the electrical mating plug connector are preferably each a coaxial plug connector, i.e. a plug connector with an outer conductor contact element, the longitudinal axis of which is positioned and oriented identically to the longitudinal axis of the single inner conductor contact element (coaxially). However, the invention also includes an electrical plug connection having more than one inner conductor contact element, for example two inner conductor contact elements, three inner conductor contact elements, four inner conductor contact elements or more than four inner conductor contact elements. The individual inner conductor contact elements are preferably each shaped here identically and are each oriented identically within the outer conductor contact element.

The inner conductor contact element and the outer conductor contact element of the electrical plug connector are preferably each configured in the form of a socket, and the inner conductor mating contact element of the electrical mating plug connector is correspondingly configured in the form of a pin and the outer conductor mating contact element of the electrical mating plug connector is correspondingly configured in the form of a socket. A variant in which the inner conductor contact element of the electrical plug connector is configured in the form of a pin and the inner conductor mating contact element of the electrical mating plug connector is correspondingly configured in the form of a socket is also conceivable.

The electrical plug connector or the electrical mating plug connector may each be a cable plug connector, a printed circuit board plug connector, a housing plug connector or an adapter between two of the stated plug connector types. In particular, it may be an adapter which is plugged in a so-called board-to-board connection between two printed circuit board plug connectors, or an adapter which is plugged in a so-called board-to-filter connection between a printed circuit board plug connector and a housing plug connector of a filter module. Lastly, the concept according to the invention can be used with an electrical plug connector and with an electrical mating plug connector which are configured as a straight plug connector or as an angled plug connector.

The inner and outer conductor contact elements as well as the inner conductor and outer conductor mating contact elements can be fabricated by machining technology (turning technology), by punching and bending technology, by deep drawing technology, by stamping technology or by other manufacturing technologies.

In the case of an electrical plug connector and in the case of an electrical mating plug connector, the outer conductor contact element preferably surrounds each inner conductor contact element over the entire axial longitudinal extent of the inner conductor contact element. In particular, the plug-side end of the outer conductor contact element can protrude beyond the plug-side end of each inner conductor contact element in the axial direction so that, in the event of a plugging process, the outer conductor contact element contacts the outer conductor mating contact element before the inner conductor mating contact element is contacted by the inner conductor contact element. In this way, the electrical plug connector in the plugging process is typically aligned with the electrical mating plug connector firstly by means of the associated plug connector housing, then by means of the associated outer conductor contact elements, and lastly by means of the associated inner conductor contact elements. Due to such a geometric arrangement between the outer and the inner conductor contact elements, the inner conductor contact element is also protected by the more robust outer conductor contact element during transport of the electrical plug connector.

In some cases, the distal end of the inner conductor contact element can protrude beyond the distal end of the outer conductor contact element in the axial direction. This is conceivable particularly in the case of adapters for a board-to-board connection or for a board-to-filter connection, also referred to as a bullet. Damage to the inner conductor contact element is prevented here, since connections of this kind generally are not plugged by way of a manual assembly process, but in automated assembly lines.

Advantageous embodiments and developments will become clear from the further dependent claims and from the description with reference to the figures of the drawings.

The features described above and those yet to be explained below can be used not only in the specified combinations, but also in other combinations or in isolation, without departing from the scope of the present invention.

In a preferred embodiment of the invention, the axial distance between the inner-conductor-side contact plane and the outer-conductor-side contact plane in the electrical plug connector or in the electrical mating plug connector corresponds approximately (in particular within the scope of tolerances) or exactly to a quarter of the wavelength of the electrical signal that is transmitted via the plug connection. In this way, the electrical signal reflected at the inner-conductor-side contact plane on account of the point of discontinuity there and the electrical signal reflected at the outer-conductor-side contact plane on account of the point of discontinuity there have a phase shift at the half-wavelength of the electrical signal. If the amplitudes of the electrical signals reflected at the inner-conductor-side contact plane and at the outer-conductor-side contact plane are of approximately the same magnitude, this results in a complete compensation between the two reflected electrical signals and thus in no reflection of an electrical signal, transmitted via the plug connection, in either of the two transmission directions.

This compensation condition refers to a transmission frequency of the electrical signal. A data signal modulated onto a high-frequency carrier signal requires a certain bandwidth relative to the carrier frequency. Therefore, a narrow-band transmission signal is preferably used for transmission via the electrical plug connection according to the invention. In addition, the axial spacing between the inner-conductor-side and outer-conductor-side contact planes is preferably designed for the frequency corresponding to the frequency of the spectral component of the narrow-band transmission signal with the highest amplitude. Thus, the spectral component of the narrow-band transmission signal with the highest amplitude can be fully compensated and is thus not reflected. The adjacent spectral components of the narrow-band transmission signal are at least partly compensated by the measure according to the invention and can be fully compensated by additional technical compensation measures.

In the event that the application-specific requirements for the reflection behavior ("return loss") of the electrical plug connection are lower, the axial distance between the inner-conductor-side contact plane and the outer-conductor-side contact plane in the electrical plug connector or in the electrical mating plug connector can also be in a range between 0.2 times and 0.3 times a wavelength of the electrical signal, preferably in a range between 0.22 times and 0.28 times the wavelength of the electrical signal, particularly preferably in a range between 0.24 times and 0.26 times the wavelength of the electrical signal.

Preferably, the inner conductor contact element and/or the outer conductor contact element is formed as a radially contacting contact element. However, an end-face contacting can also be provided.

In the preferred realization of radial contacting between the contact elements of the plug connector and the mating plug connector, the contact element or alternatively the mating contact element is formed as a spring contact sleeve with at least two spring lugs on each of the inner conductor side and outer conductor side. The spring contact sleeve provides sufficient contact pressure between the two contact partners. In addition, contacting by means of a spring contact sleeve avoids axially spaced multiple contacting points to the contact partner and thus undesirable passive intermodulations. Contacting to the contact partner is achieved solely via contact points on the individual spring lugs, which lie on a circular line of the contact plane.

In the event that the plug-in-side end of the at least one inner conductor contact element projects in the axial direction beyond the plug-in-side end of the outer conductor contact element of the plug connector, in a further preferred embodiment of the invention an insulator element surrounds the at least one inner conductor contact element between the inner-conductor-side contact plane and the outer-conductor-side contact plane. The insulator element, referred to hereinafter as an additional insulator element, is configured to fill a space between an outer conductor mating contact element of the mating plug connector and the at least one inner conductor contact element of the plug connector in a plugged state of the plug connector and the mating plug connector.

In particular for an inner conductor contact element which is formed as a spring contact sleeve and is therefore easier to damage, the additional insulator element can serve as transport protection. In addition, the additional insulator element allows mechanical stabilization of the plug connector in the mating plug connector and stronger centering, i.e. alignment or parallelization of the plug connector relative to the mating plug connector.

If the plug connector is used as an adapter in a board-to-board connections or in a board-to-filter connection, there may be a displacement between the two printed circuit boards or between the printed circuit board and the filter module from a correctly mutually aligned position in a direction transverse to the longitudinal axis of the adapter. Such a radial offset between the two printed circuit board plug connectors or between a printed circuit board plug connector and a housing plug connector of the filter module should be compensated by the adapter. For this purpose, in a further preferred embodiment of the plug connector, a further elasticity is formed in the inner conductor contact element which bridges the radial offset occurring between the two axial ends of the adapter. The further elasticity of the inner conductor contact element is preferably a slot-shaped recess in the inner conductor contact element.

The slot-shaped recess is a slot formed on the outer lateral surface of the inner conductor contact element, the longitudinal extent of the slot running transversely to the longitudinal axis of the inner conductor contact element. Preferably, four slot-shaped recesses are formed which, starting from the outer lateral surface of the inner conductor contact element, each run in one of four mutually orthogonal directions. With recesses in the inner conductor contact element that are shaped and oriented in this way, a radial offset can thus be compensated in all four radial directions in the adapter. Preferably, the slot-shaped recesses are formed in an axial portion of the inner conductor contact element that is directly adjacent to the axial end of the inner conductor contact element formed as a spring contact sleeve. In this axial portion, no insulator element is arranged between the inner conductor contact element and the outer conductor contact element, so that a radial displacement between the axial end and the middle portion of the inner conductor contact element is possible.

In addition to compensating for a radial offset, the slot-shaped recesses in the inner conductor contact element can also compensate for a lack of centricity between the inner conductor and outer conductor contact elements of the plug connector.

Alternatively, or in addition to, the slot-shaped recesses in the inner conductor contact element, at least one slot-shaped recess can also be formed in the inner conductor mating contact element in order to compensate for a radial offset or a lack of centricity between the inner conductor and outer conductor mating contact element of the mating plug connector. For the arrangement and the shaping of the individual slot-shaped recess in the inner conductor mating contact element, the same applies analogously as for the individual slot-shaped recesses in the inner conductor contact element. If an insulator element is formed in the mating plug connector axially adjacently to the slot-shaped recesses in the inner conductor mating contact element, slot-shaped recesses are also preferably to be formed in the insulator element, preferably in the axial vicinity, with regard to the possibility of elastic deformation of the inner conductor mating contact element in the radial direction. In addition, a clearance is preferably formed between the outer conductor mating contact element and the inner conductor mating contact element or the insulator element axially adjacent to the slot-shaped recesses in the inner conductor contact element or in the insulator element, said clearance allowing the radial movability of the inner conductor mating contact element with or without the insulator element.

An electrical plug connection equipped in accordance with the invention for transmitting a high-frequency signal lastly exhibits a minimized reflection behavior, preferably no reflection behavior, along its entire transmission path. The course of the wave impedance thus exhibits minimized discontinuity points, preferably no discontinuity points, along the entire transmission path.

Only in the case of the plug connector, and the plug connection, is there a discontinuity point in the course of the wave impedance in the inner-conductor-side and outer-conductor-side contact planes. A first axial longitudinal portion of the plug connector between the inner-conductor-side and outer-conductor-side contact planes thus has a different wave impedance than a second axial longitudinal portion of the plug connector, which is adjacent to the first axial longitudinal portion. Similarly, a fourth axial longitudinal portion of the mating plug connector between the outgoing-side end of the inner-conductor-side mating contact region and the plug-in-side end of the outer-conductor-side mating contact region has a different wave impedance than a third axial longitudinal portion of the mating plug connector that is adjacent to the fourth axial longitudinal portion.

To minimize discontinuity points in the course of the wave impedance within the plug connection and in the transition to other transmission components that are mechanically and electrically connected to the plug connection, for example other plug connectors, cables or printed circuit boards with electrical conductors, the course of the wave impedance within the first, second, third and fourth longitudinal portions is preferably constant. In addition, the wave impedance in the second longitudinal portion of the plug connector preferably corresponds to the wave impedance of the third longitudinal portion of the mating plug connector and is matched to the wave impedance of the further transmission components and is, for example, 50Ω.

To allow outer-conductor-side and inner-conductor-side electrical contacting between the electrical plug connector and the electrical mating plug connector even for different axial distances between the plug connector and the mating plug connector within a certain predefined distance interval, the outer-conductor-side and inner-conductor-side contact regions of at least one of the contact partners each have an axial extent corresponding to the distance interval. Thus, the outer-conductor-side and inner-conductor-side contact regions of one contact partner can electrically contact different contact positions within the contact regions of the other contact partner depending on the axial distance. In this way, for example, a variable axial offset, i.e. a variable distance, between a printed circuit board and another printed circuit board or alternatively a filter module can be electrically bridged. For this purpose, the contact regions of the adapter formed in the outer and inner conductor contact element each contact different contact positions within the outer conductor-side or inner-conductor-side mating contact region of the printed circuit board plug connector or of the housing plug connector belonging to the filter module.

In order to realize an inner-conductor-side and an outer-conductor-side contacting for different axial distances between the electrical plug connector and the electrical mating plug connector, the inner-conductor-side and the outer-conductor-side mating contact regions of the electrical mating plug connector preferably have a sufficient axial extent. The axial extent includes contacting at the widest distance and at the narrowest distance between the electrical plug connector and the electrical mating plug connector.

To allow inner-conductor-side and outer-conductor-side contacting for different distances between the electrical plug connector and the electrical mating plug connector, a recess is preferably formed in each of the outer conductor mating contact element and the insulator element of the mating plug connector and extends along the outer-conductor-side mating contact region and along the inner-conductor-side mating contact region, respectively. This recess in the outer conductor mating contact element and in the insulator element of the mating plug connector forms in each case a step and thus a discontinuity point in the course of the outer conductor mating contact element and in the insulator element of the electrical mating plug connector. The discontinuity point is located at an outgoing-side end of the outer conductor mating contact region or at an outgoing-side end of the inner-conductor-side mating contact region.

To achieve mutual compensation of the signal reflected at each of these two discontinuity points, proceed in the same way as for compensation of the signal reflected at each of the inner and outer conductor contact planes of the plug connector.

An axial distance between an outgoing-side end of the inner-conductor-side mating contact region and an outgoing-side end of the outer-conductor-side mating contact region is to be set such that in a plugged state of the electrical plug connector and of the electrical mating plug connector, compensation of the electrical signal reflected at the outgoing-side end of the inner-conductor-side mating contact region and the electrical signal reflected at the outgoing-side end of the outer-conductor-side mating contact region, respectively, can be achieved. Preferably, the axial distance between an electrical signal reflected at the outgoing-side end of the inner-conductor-side mating contact region and an electrical signal reflected at the outgoing-side end of the outer-conductor-side mating contact region of the mating plug connector corresponds in each case to a quarter of the wavelength of the electrical signal. Here, and in the following, an outgoing-side end of the inner-conductor-side or outer-conductor-side mating contact region is understood to be the end of the inner-conductor-side or outer-conductor-side mating contact region axially opposite the plug-in-side end.

In order to be able to realize an axial distance between the electrical plug connector and the electrical mating plug connector within a maximally realizable axial offset, an axial distance between a plug-in-side end and an outgoing-side end of the inner-conductor-side mating contact region can be formed which is at least as large as the predetermined maximum axial offset between the electrical plug connector and the electrical mating plug connector. Preferably, the axial distance between the plug-side end and the outgoing-side end of the inner-conductor-side mating contact region can correspond to the predetermined maximum axial offset between the electrical plug connector and the electrical mating plug connector. In this way, an inner-conductor-side contacting between the inner conductor contact element and the inner conductor mating contact element can be realized for any axial distance within a predetermined maximum axial offset between the electrical plug connector and the associated electrical mating plug connector.

Analogously to the axial distance between a plug-in-side end and an outgoing-side end of the inner-conductor-side mating contact region, an axial distance between a plug-in-side end and an outgoing-side end of the outer-conductor-side mating contact region of the mating plug connector can be formed which is at least as large as a predetermined maximum axial offset between the electrical plug connector and the electrical mating plug connector. Preferably, the axial distance between the plug-side end and the outgoing-side end of the outer-conductor-side mating contact region can correspond to the predetermined maximum axial offset between the electrical plug connector and the electrical mating plug connector.

In order to realize the outer-conductor-side contacting before the inner-conductor-side contacting in the plugging process, an axial distance between the plug-in-side end of the outer-conductor-side mating contact region and the plug-in-side end of the inner-conductor-side mating contact region of the mating plug connector is preferably set up to be greater than an axial distance between an inner-conductor-side and an outer-conductor-side contact plane of the plug connector. The delayed inner-conductor-side contacting compared to the outer-conductor-side contacting advantageously allows a premature alignment or centering of the outer conductor contact element relative to the outer conductor mating contact element compared to the alignment or centering of the inner conductor contact element relative to the inner conductor mating contact element.

The subsequent centering of the inner conductor contact element with respect to the inner conductor mating contact element, in particular as a result of a lack of centricity between the outer conductor contact element and the inner conductor contact element of the electrical plug connector and/or a lack of centricity between the outer conductor mating contact element and the inner conductor mating contact element of the electrical mating plug connector, is made possible by the slot-shaped recesses in the inner conductor contact element already described above.

In analogy to the electrical plug connector, in which the inner conductor contact element is either surrounded by an insulator element, in particular in the first axial longitudinal portion between the inner-conductor-side contact plane and the outer-conductor-side contact plane, the inner conductor mating contact element of the electrical mating plug connector can also be sheathed by an insulator element at least in some portions along the inner-conductor-side mating contact region, preferably along the entire inner-conductor-side mating contact region.

For this purpose, a space between the outer conductor mating contact element and the inner conductor mating contact element is filled at least in some portions along the inner-conductor-side mating contact region, preferably along the entire inner-conductor-side mating contact region, by an insulator element of the electrical mating plug connector in such a way that the inner conductor contact element of the electrical plug connector can be inserted between the insulator element and the inner conductor mating contact element. Very particularly preferably, no air gap is formed between the insulator element of the electrical mating plug connector and the inner conductor contact element.

In summary, it can be asserted that in the plugged state of the plug connection, the space which is delimited axially by the inner-conductor-side contact plane and the outer-conductor-side contact plane and radially by the outer conductor contact element or the outer conductor mating contact element and the inner conductor contact element or the inner conductor mating contact element, respectively, is filled at least in some portions by the insulator element of the electrical plug connector or by the insulator element of the electrical mating plug connector.

If, in the plugged state, the axial spacing between the electrical plug connector and the electrical mating plug connector is between the two extreme positions, i.e. between the narrowest possible and the widest possible axial spacing, there is no reflection of a high-frequency electrical signal within the plug connection, since the axial distance between the plug-side end of the outer conductor contact element and the outgoing-side end of the outer-conductor-side mating contact region corresponds to the axial distance between the plug-side end of the inner conductor contact element and the outgoing-side end of the inner-conductor-side mating contact region.

Lastly, the invention also covers an electrical plug connection comprising an electrical plug connector according to the above and following embodiments and an associated electrical mating plug connector. The mating plug connector is preferably (but not necessarily) the mating plug connector described above and below.

The technical features, technical measures, technical effects and technical advantages of the electrical plug connector and of the electrical mating plug connector already described, and described below, also apply analogously for the electrical plug connection, and vice versa.

The above embodiments and developments can be combined with each other as desired, if expedient. Further possible embodiments, developments and implementations of the invention also include combinations, not explicitly mentioned, of features of the invention described above or below in relation to the exemplary embodiments. In particular, a person skilled in the art will also add individual aspects as improvements or supplementations to the particular basic form of the present invention.

SUMMARY

A principal aspect of the present invention is an electrical plug connector (2) for electrical and mechanical connection to an electrical mating plug connector (3), having an outer conductor contact element (5) and at least one inner conductor contact element (4), which extends at least in some portions through the outer conductor contact element (5), wherein the inner conductor contact element (4) has an inner-conductor-side contact region (7) and the outer conductor contact element (5) has an outer-conductor-side contact region (8), wherein an inner-conductor-side contact plane (13) oriented transversely to the plug-in direction is spanned by contact points of the inner-conductor-side contact region (7) which are each set up to contact a corresponding contact point of an inner conductor mating contact element (11) of the mating plug connector (3), and an outer-conductor-side contact plane (14) oriented transversely to the plug-in direction is spanned by contact points of the outer-conductor-side contact region (8) which are each set up to contact a corresponding contact point of an outer-conductor mating contact element (12) of the mating plug connector (3), wherein the inner-conductor-side contact plane (13) and the outer-conductor-side contact plane (14) are spaced apart from one another in the plug-in direction in such a way that, in a plugged state of the plug connector (2) and of the mating plug connector (3), compensation of an electrical signal reflected in the inner-conductor-side contact plane (13) by an electrical signal reflected in the outer-conductor-side contact plane (14) is attainable.

A further aspect of the present invention is an electrical plug connector (2), characterized in that the axial distance between the inner-conductor-side contact plane (13) and outer-conductor-side contact plane (14) lies in a range between 0.2 times and 0.3 times a wavelength of the electrical signal, preferably in the range between 0.22 times and 0.28 times the wavelength of the electrical signal, particularly preferably in the range between 0.24 times and 0.26 times the wavelength of the electrical signal, and very particularly preferably corresponds to a quarter of the wavelength of the electrical signal.

A further aspect of the present invention is an electrical plug connector (2), characterized in that the inner conductor contact element (4) and the outer conductor contact element (5) are each formed as a radially contacting contact element.

A further aspect of the present invention is an electrical plug connector (2), characterized in that the inner conductor contact element (4) and/or the outer conductor contact element (5) are formed in each case as an elastic contact element and preferably have at least two spring lugs (10), the contact points of which span the inner-conductor-side contact plane (13) or outer-conductor-side contact plane (14) respectively.

A further aspect of the present invention is an electrical plug connector (2), characterized in that the inner conductor contact element (4) extends in a portion between the inner-conductor-side contact plane (13) and the outer-conductor-side contact plane (14) through an insulator element (25) which, in a plugged state of the electrical plug connector (2) and of the electrical mating plug connector (3), is set up to fill a space between the outer conductor mating contact element (12) of the electrical mating plug connector (3) and the inner conductor contact element (4).

A further aspect of the present invention is an electrical plug connector (2), characterized in that a further elasticity, preferably a slot-shaped recess (15), is formed on the inner conductor contact element (4) to compensate for a radial offset between the inner conductor contact element (4) and the inner conductor mating contact element (11).

A further aspect of the present invention is an electrical plug connector (2), characterized in that a first axial longitudinal portion (I) of the electrical plug connector (2) extends between the inner-conductor-side contact plane (13) and the outer-conductor-side contact plane (14), and in a second axial longitudinal portion (II) of the electrical plug connector (2), which is axially adjacent to the first axial longitudinal portion (I), the electrical plug connector (2) has a wave impedance which is set up to correspond to a wave impedance in a third axial longitudinal portion (III) of the electrical mating plug connector (3).

A further aspect of the present invention is an electrical mating plug connector (3) for electrical and mechanical connection to an electrical plug connector (2), having an outer conductor mating contact element (12) and at least one inner conductor mating contact element (11) which extends at least in some portions through the outer conductor mating contact element (12), wherein the inner conductor mating contact element (11) has an inner-conductor-side mating contact region (18) and the outer conductor mating contact element (12) has an outer-conductor-side mating contact region (19), wherein an inner-conductor-side contact plane (13) oriented transversely to the plug-in direction is spanned by contact points of the inner-conductor-side mating contact region (18) which are each set up to contact a corresponding contact point of an inner conductor contact element (4) of the electrical plug connector (2), and an outer-conductor-side contact plane (14) oriented transversely to the plug-in direction is spanned by contact points of the outer-conductor-side mating contact region (19) which are each set up to contact a corresponding contact point of an outer-conductor contact element (5) of the electrical plug connector (2), wherein the inner-conductor-side contact plane (13) and the outer-conductor-side contact plane (14) are spaced apart from one another in the plug-in direction in such a way that, in a plugged state of the electrical plug connector (2) and of the electrical mating plug connector (3), compensation of an electrical signal reflected in the inner-conductor-side contact plane (13) by an electrical signal reflected in the outer-conductor-side contact plane (14) is attainable.

A further aspect of the present invention is an electrical mating plug connector (3), characterized in that in that the axial distance between the inner-conductor-side contact plane (13) and the outer-conductor-side contact plane (14) lies in a range between 0.2 times and 0.3 times a wavelength of the electrical signal, preferably in the range between 0.22 times and 0.28 times the wavelength of the electrical signal, particularly preferably in the range between 0.24 times and 0.26 times the wavelength of the electrical signal, and very particularly preferably corresponds to a quarter of the wavelength of the electrical signal.

A further aspect of the present invention is an electrical mating plug connector (3), characterized in that an axial distance between an outgoing-side end (20) of the inner-conductor-side mating contact region (18) and an outgoing-side end (21) of the outer-conductor-side mating contact region (19) is set up in such a way that, in a plugged state of the electrical plug connector (2) and of the electrical mating plug connector (3), compensation of an electrical signal reflected at the outgoing-side end (20) of the inner-conductor-side mating contact region (18) by an electrical signal reflected at the outgoing-side end (21) of the outer-conductor-side mating contact region (19) is attainable.

A further aspect of the present invention is an electrical mating plug connector (3), characterized in that an axial distance between a plug-side end (23) and the outgoing-side end (20) of the inner-conductor-side mating contact region (18) corresponds at least to a maximum axial offset between the electrical plug connector (2) and the mating plug connector (3) realizable in the at least partly plugged state.

A further aspect of the present invention is an electrical mating plug connector (3), characterized in that an axial distance (L) between a plug-side end (22) of the outer-conductor-side mating contact region (19) and a plug-side end (23) of the inner-conductor-side mating contact region (18) is greater than an axial distance between the inner-conductor-side contact plane (13) and the outer-conductor-side contact plane (14) of the electrical plug connector (2).

A further aspect of the present invention is an electrical mating plug connector (3), characterized in that a space between the outer conductor mating contact element (12) and the inner conductor mating contact element (11) is filled at least in some portions along the inner-conductor-side mating contact region (18), preferably along the entire inner-conductor-side mating contact region (18), by an insulator element (17) of the electrical mating plug connector (3) in such a way that the inner conductor contact element (4) of the electrical plug connector (2) can be inserted between the insulator element (17) and the inner conductor mating contact element (11).

A still further aspect of the present invention is an electrical mating plug connector (3), characterized in that a fourth axial longitudinal portion (IV) of the electrical mating plug connector (3) extends between the outgoing-side end (20) of the inner-conductor-side mating contact region (18) and the plug-side end (22) of the outer-conductor-side mating contact region (19), and in a third axial longitudinal portion (III) of the mating plug connector (3), which is axially adjacent to the fourth axial longitudinal portion (IV), the electrical mating plug connector (3) has a wave impedance which is set up to correspond to a wave impedance in a second axial longitudinal portion (II) of the electrical plug connector (2).

An even still further aspect of the present invention is an electrical plug connection (1) comprising an electrical plug connector (2) and the electrical mating plug connector (3).

These and other aspects of the present invention are more fully set forth and disclosed herein.

BRIEF DESCRIPTIONS OF THE FIGURES

The present invention will be explained in greater detail hereinafter with reference to the exemplary embodiments shown in the schematic figures of the drawing, in which.

The accompanying figures of the drawings are intended to provide a further understanding of embodiments of the invention. They illustrate embodiments and, in conjunction with the description, serve to explain principles and concepts of the invention. Other embodiments and many of the advantages mentioned will be apparent with reference to the drawings. The elements of the drawings are not necessarily shown to scale with respect to each other.

In the figures of the drawings, like, functionally like and similarly acting elements, features and components are provided in each case with the same reference signs, unless otherwise specified.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1A:
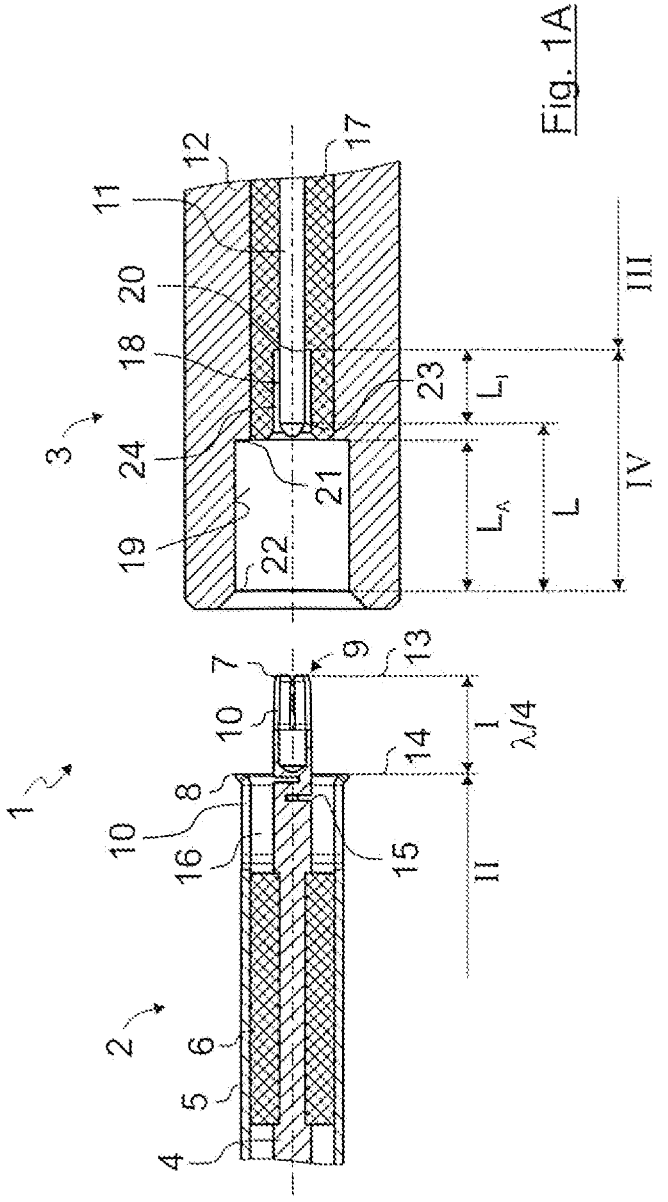
FIG. 1A shows a cross-sectional illustration of a plug connection according to the invention in the unplugged state.
Figure 1B:
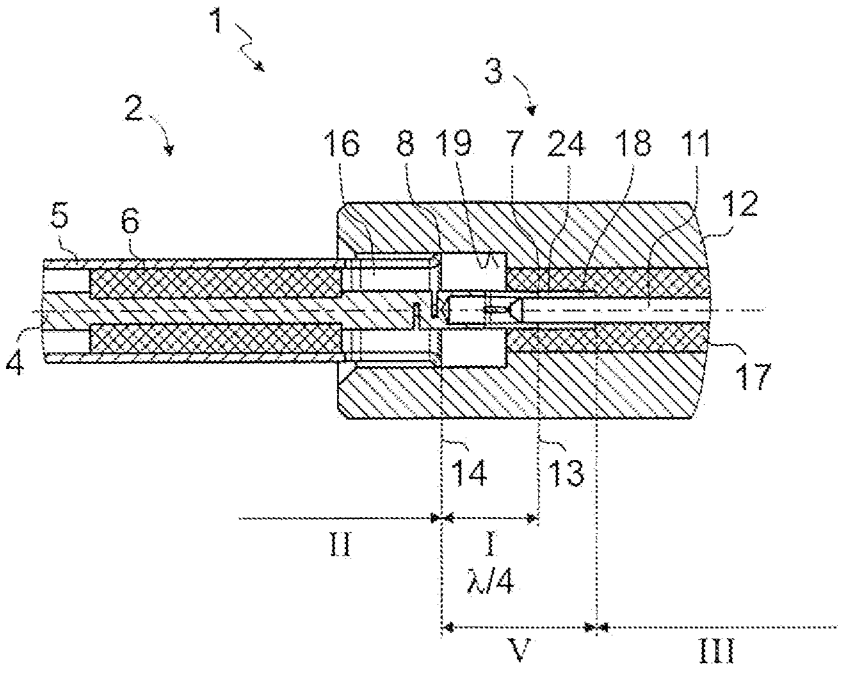
FIG. 1B shows a cross-sectional illustration of a plug connection according to the invention in a first partly plugged state.
Figure 1C:
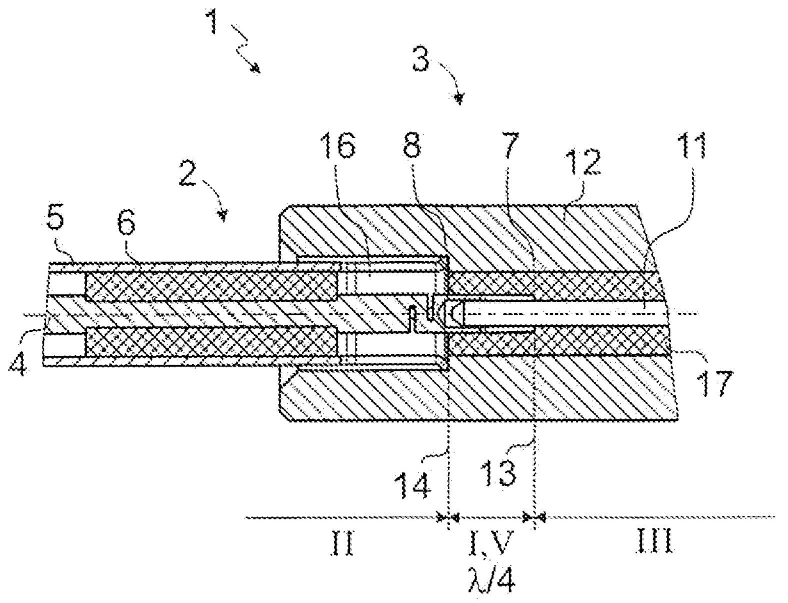
FIG. 1C shows a cross-sectional illustration of a plug connection according to the invention in a second fully plugged state.

FIGS. 1A to 1C show a first variant of an electrical plug connection 1 comprising an electrical plug connector 2 and an associated electrical mating plug connector 3. The electrical plug connection 1 shown in FIGS. 1A to 1C relates to a plug connector 2 formed as an adapter (=bullet) and an electrical mating plug connector 3 formed as a housing plug connector of a filter module, as used in a printed circuit board-to-filter connection (board-to-filter connection) or alternatively in a printed circuit board-to-printed circuit board connection (board-to-board connection). The electrical plug connector 2 is designed in particular to compensate for a variable distance between the printed circuit board and the filter module or between two printed circuit boards, i.e. an axial offset.

The electrical plug connector 2 has an inner conductor contact element 4, which is coaxially sheathed by an outer conductor contact element 5 at least in a middle axial longitudinal portion. For mechanical spacing and electrical insulation of the inner conductor contact element 4 from the outer conductor contact element 5, an insulator element 6 is arranged between the inner conductor contact element 4 and the outer conductor contact element 5 at least in the middle axial longitudinal portion.

An inner-conductor-side contact region 7 of the inner conductor contact element 4 and an outer-conductor-side contact region 8 of the outer conductor contact element 5 are provided and are each formed by way of example at the plug-in-side end 9 of the electrical plug connector 2. The contact regions 7, 8 are each formed elastically, i.e. as a spring contact sleeve with a plurality of spring lugs 10. The inner-conductor-side contacting between the spring lugs 10 of the inner-conductor-side contact region 7 of the electrical plug connector 2 and an inner conductor mating contact element 11 of the electrical mating plug connector 3 takes place via individual contact points on the spring lugs 10 lying on a circular line in an inner-conductor-side contact plane 13. Equivalently, the outer-conductor-side contacting between the spring lugs 10 of the outer-conductor-side contact region 8 of the electrical plug connector 2 and an outer conductor mating contact element 12 of the mating plug connector 3 takes place via individual contact points on the spring lugs 10 lying on a circular line in an outer-conductor-side contact plane 14.

It should be noted at this juncture that the variants of the plug connection 1, or rather of the electrical plug connector 2, shown in the exemplary embodiments, in which the contact planes 13, 14 are each located at the distal end of the inner conductor contact element 4 and the outer conductor contact element 4 respectively, are not to be understood in a limiting manner. Within the scope of the claimed invention, it may also be provided that the contact planes 13, 14 are axially offset with respect to the relevant distal end. For example, spring lugs 10 with conically curved contact regions 7, 8 of which the contact points are spaced from the distal end are frequently used.

The axial distance between the inner-conductor-side contact plane 13 and the outer-conductor-side contact plane 14 preferably corresponds to a quarter of the wavelength (i.e. $\lambda/4$) of the electrical signal to be transmitted via the plug connection 1, in particular the high-frequency signal to be transmitted. With this geometrical configuration of the plug connector, optimum suppression of a reflection of an electrical signal at the inner-conductor-side contact plane 13 and at the outer-conductor-side contact plane 14 is possible, provided that the amplitudes of the electrical signals reflected at the inner-conductor-side contact plane 13 and at the outer-conductor-side contact plane 14 are each equal. The latter condition is typically given. In the variant of the plug connection 1 shown in FIGS. 1A to 1C, the inner-conductor-side contact plane 13 projects axially beyond the outer-conductor-side contact plane 14.

In an axial portion of the inner conductor contact element 4 adjacent to the spring sleeve, a plurality of slot-shaped recesses 15, preferably four slot-shaped recesses 15, are formed in the inner conductor contact element 4, and, with regard to their longitudinal extent, each extend from the outer lateral surface of the inner conductor contact element 4 in mutually orthogonal directions to the longitudinal axis of the inner conductor contact element 4. With an elasticity in the inner conductor contact element 4 realized by the slot-shaped recesses 15, it is possible to compensate for an asymmetry between the inner conductor contact element 4 and the outer conductor contact element 5.

On the other hand, the slot-shaped recesses 15 in the inner conductor contact element 4 and the spring lugs 10 of the outer conductor contact element 5 allow inner-conductor-side and outer-conductor-side elasticity to compensate for a radial offset between a printed circuit board and a filter module or between two printed circuit boards via the adapter arranged between them and the printed circuit board plug connector connected to the printed circuit board or the housing plug connector connected to the filter module. In order to thus compensate for an existing asymmetry or an existing radial offset via the elasticity of the slot-shaped recesses 15, a clearance 16, (i.e. an area freed from the insulator element 6), is formed between the inner conductor contact element 4 and the outer conductor contact element 5 in the axial region of the slot-shaped recesses 15. With regard to impedance matching, the inner conductor contact element 4 has a diameter in the axial portion of the clearance 16 which is increased compared to the diameter in the axial portion with the insulator element 6.

The electrical mating plug connector 3 has an inner conductor mating contact element 11 in the form of a pin, an outer conductor mating contact element 12 in the form of a socket, and an insulator element 17 arranged therebetween. In the case of a filter module, the electrical mating plug connector 3 can also be formed as a housing plug connector in a bushing of the housing belonging to the filter module. If the plug connection is used in a board-to-board connection or in a board-to-filter connection, the inner-conductor-side mating contact region 18 of the inner conductor mating contact element 12 and the outer-conductor-side mating contact region 19 of the outer conductor mating contact element 11 each have a specific axial extent in order to compensate for an axial offset between a printed circuit board and a further printed circuit board or a filter module. The axial extent of the inner-conductor-side contact region 18 and of the outer-conductor-side contact region 19 corresponds in each case at least to the permissible maximum axial offset.

FIG. 1B shows a plug-in connection 1 in an exemplary first plug-in position, in which the inner-conductor-side contact plane 13 is located in a middle region of the inner-conductor-side mating contact region 18 and the outer-conductor-side contact plane 14 is also located in a middle region of the outer-conductor-side mating contact region 19.

In the first plug-in position, the electrical plug connector 2 is only partially inserted in the electrical mating plug connector 3 in the axial direction. FIG. 1C shows a second plug-in position of the plug connection 1, in which the inner-conductor-side contact plane 13 is located in an end position of the inner-conductor-side mating contact region 18 facing away from the plug-in side and the outer-conductor-side contact plane 14 is also located in an end position of the outer-conductor-side mating contact region 19 facing away from the plug-in side. The electrical plug connector 2 is inserted in the electrical mating plug connector 3 in the second plug-in position in the axial direction to the maximum extent possible.

To ensure that a reflection of the electrical signal is minimized, preferably completely compensated, also in the second plug-in position of the plug connection 1, the axial distance between the outgoing-side end 20 of the inner-conductor-side mating contact region 18 and the outgoing-side end 21 of the outer-conductor-side mating contact region 19 preferably corresponds to a quarter of a wavelength λ/4 of the electrical signal to be transmitted via the plug connection 1.

It can also be seen from FIG. 1A that the axial distance L between the plug-side end 22 and the plug-side end 23 of the inner-conductor-side mating contact region 18 is preferably greater than the axial distance between the inner-conductor-side contact plane 13 and the outer-conductor-side contact plane 14 amounting to preferably a quarter of a wavelength λ/4 of the electrical signal to be transmitted via the plug connection 1. This guarantees that, in a plugging process, the outer-conductor-side contacting precedes the inner-conductor-side contacting between the plug connector 2 and the mating plug connector 3.

The axial extent $L_A$ of the outer-conductor-side mating contact region 19 between the plug-side end 22 and the outgoing-side end 21 of the outer-conductor-side mating contact region 19 and the axial extent $L_I$ of the inner-conductor-side mating contact region 18 between the plug-side end 23 and the outgoing-side end 20 of the inner-conductor-side mating contact region 18 correspond at least to the maximally permissible axial offset, as also shown in FIG. 1A.

To allow the inner conductor contact element 4 of the electrical plug connector 2 to be joined as far as the outgoing-side end 20 of the inner-conductor-side mating contact region 18 of the inner conductor mating contact element 17 of the electrical mating plug connector 3, the insulator element 17 of the mating plug connector has a sleeve-shaped recess 24 on its inner lateral surface over the axial extent of the inner-conductor-side mating contact region 18. The sleeve-shaped recess 24 is preferably formed in such a way that, when the plug connection 1 is in the fully plugged state, the insulator element 17 completely fills the axial region between the outer conductor mating contact element 12 and the inner conductor contact element 4.

The sleeve-shaped recess 24 of the insulator element 17 forms a step at the outgoing-side end 20 of the inner-conductor-side mating contact region 18, said step forming an axial stop for the inner conductor contact element 4 of the electrical plug connector 2 in the fully plugged state according to FIG. 1C. Equivalently, the outer conductor mating contact element 12 has a step at the outgoing-side end of the outer-conductor-side mating contact region 19, said step forming an axial stop for the outer conductor contact element 5 of the electrical plug connector 2 in the fully plugged state.

The electrical plug connector 2 has a first axial longitudinal portion I extending between the inner-conductor-side contact plane 13 and the outer-conductor-side contact plane 14. This is followed by a second axial longitudinal portion II of the electrical plug connector 2, as can be seen in FIGS. 1A to 1C. Similarly, the electrical mating plug connector 3 has a third axial longitudinal portion III and a fourth axial longitudinal portion IV. It is envisaged that the wave impedance in the second axial longitudinal portion II of the electrical plug connector 2 and in the third axial longitudinal portion III of the electrical mating plug connector 3 is identical. In a fifth axial longitudinal portion V of the plug connector 1, which is located between the second and third axial longitudinal portions when the plug connector 1 is in the plugged state, there is a wave impedance that differs therefrom, in particular a higher wave impedance than in the second and third axial longitudinal portions II and III.

Figure 2A:
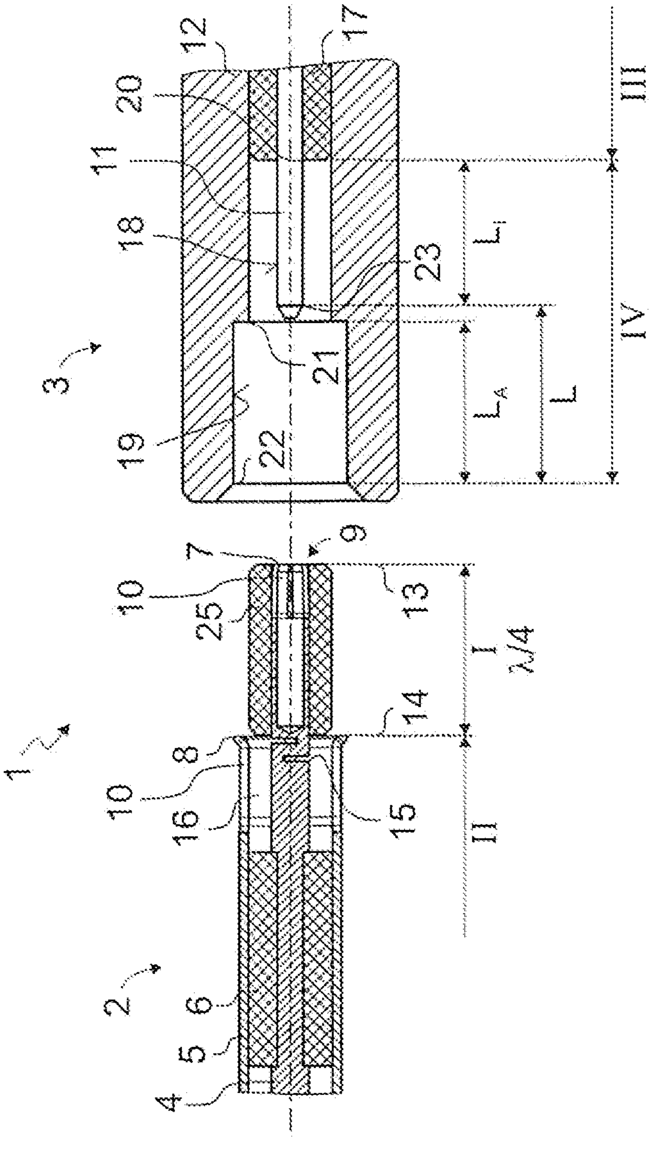
FIG. 2A shows a cross-sectional illustration of a preferred extension of the plug connection according to the invention in the unplugged state.
Figure 2B:
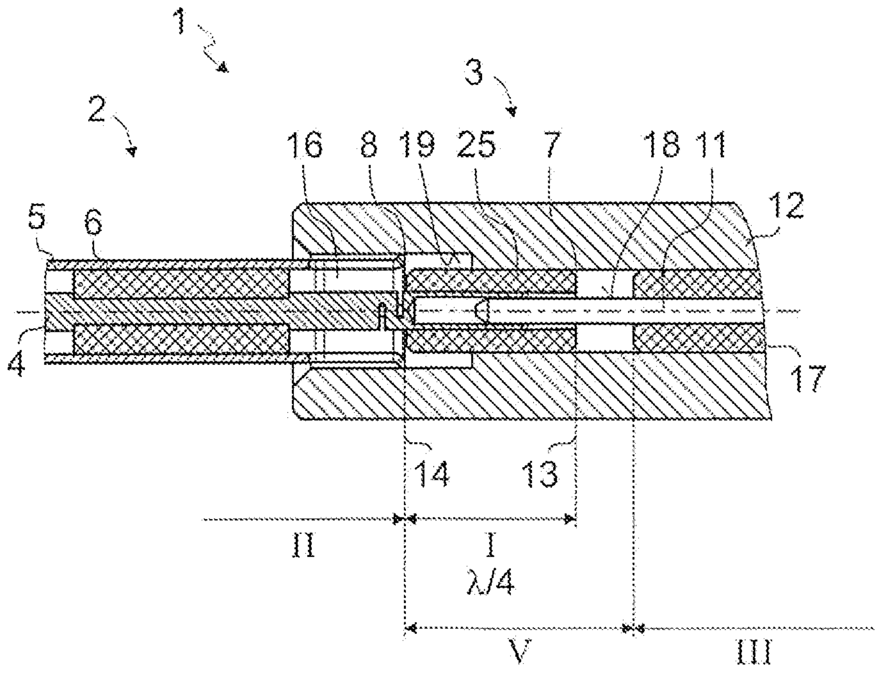
FIG. 2B shows a cross-sectional illustration of a preferred extension of the plug connection according to the invention in a first partly plugged state.
Figure 2C:
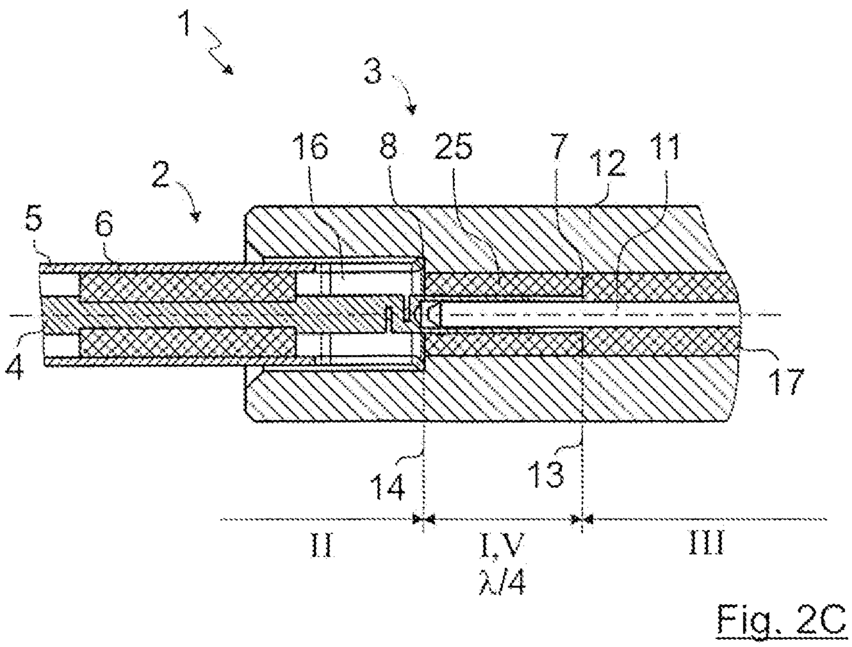
FIG. 2C shows a cross-sectional illustration of a preferred extension of the plug connection according to the invention in a second fully plugged state.

FIGS. 2A to 2C each show a preferred extension of the first variant of a plug connection 1 according to the invention already disclosed in FIGS. 1A to 1C. For transport protection of the elastically formed inner conductor contact element 4, which has an axial protrusion with respect to the outer conductor contact element 5, the axial portion of the inner conductor contact element 4 between the inner-conductor-side contact plane 13 and the outer-conductor-side contact plane 14 is surrounded by an additional insulator element 25. The additional insulator element 25 of the electrical plug connector 2 preferably has an outer diameter that corresponds to the outer diameter of the insulator element 17 arranged in the electrical mating plug connector 3. The axial extent of the insulator element 17 arranged in the electrical mating plug connector 3 is reduced by the axial extent of the additional insulator element 25. Both geometrical conditions allow, on the one hand, the electrical plug connector 2 to be inserted into the electrical mating plug connector 3 and, on the other hand, the space between the outer conductor mating contact element 12 and the inner conductor contact element 4 to be completely filled over the first axial longitudinal portion I of the electrical plug connector 2 when the electrical plug connector 2 is fully plugged into the electrical mating plug connector 3.

Figure 3A:
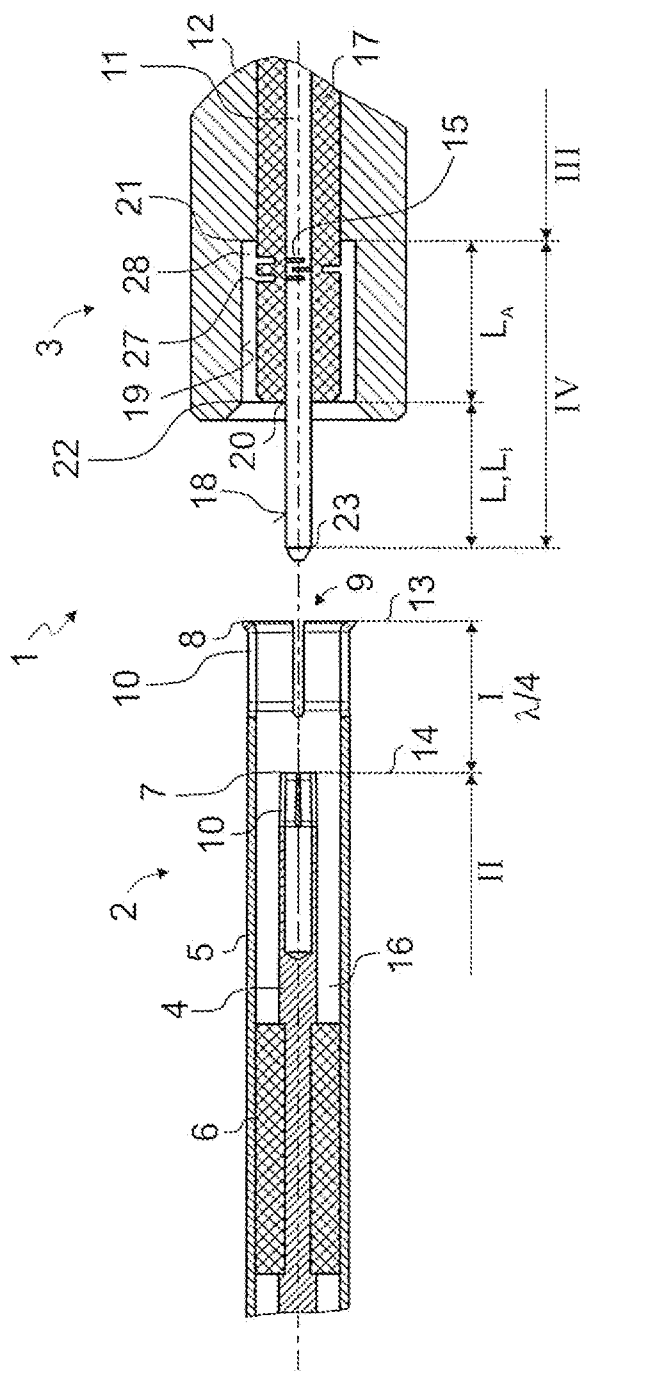
FIG. 3A shows a cross-sectional illustration of a second variant of the plug connection according to the invention in the unplugged state.
Figure 3B:
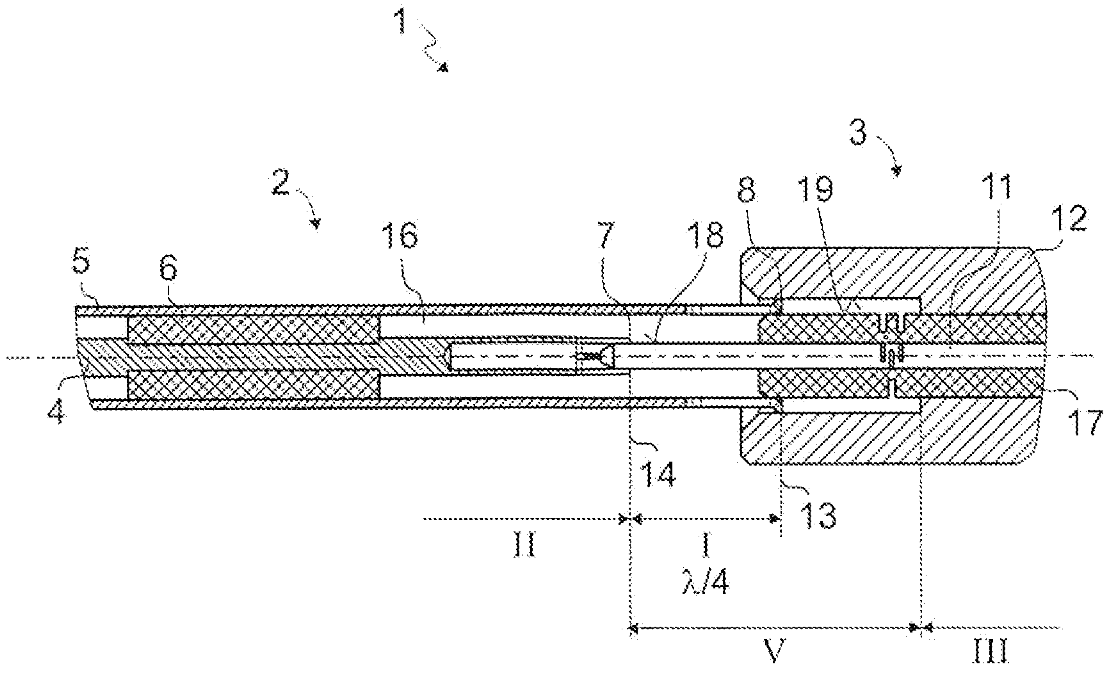
FIG. 3B shows a cross-sectional illustration of a second variant of the plug connection according to the invention in a first partly plugged state.
Figure 3C:
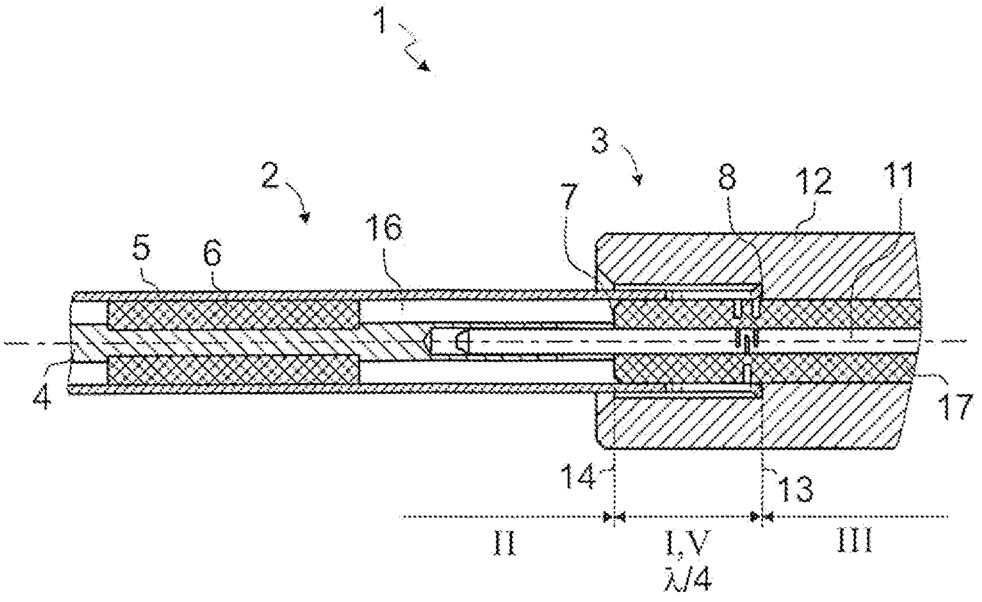
FIG. 3C shows a cross-sectional illustration of a second variant of the plug connection according to the invention in a second fully plugged state.

FIGS. 3A to 3C show a second variant of a plug connection 1 in which the outer conductor contact element 5 projects axially beyond the inner conductor contact element 4. Consequently, the inner conductor mating contact element 11 projects beyond the outer conductor mating contact element 12 of the electrical mating plug connector 3.

In order to compensate for a radial offset in a board-to-board connection or in a board-to-filter connection in the second variant of a plug connection 1, an elasticity of the outer conductor contact element 5 belonging to the electrical plug connector 2, i.e. the outer-conductor-side spring contact sleeve, and an elasticity of the inner conductor mating contact element 11 belonging to the electrical mating plug connector 3 are used.

This is due to the fact that in the second variant the inner conductor mating contact element 11 of the electrical mating plug connector 3 forms the protruding and thus longer contact element, while in the first variant the inner conductor contact element 4 of the electrical plug connector 2 forms the protruding and thus longer contact element.

For this purpose, four slot-shaped recesses 15 are preferably formed in the pin-shaped inner conductor mating contact element 11, the longitudinal extent of each of which extends from the outer lateral surface of the inner conductor mating contact element 11 in mutually orthogonal directions in the direction of the longitudinal axis of the inner conductor mating contact element 11. In order to allow a radial elasticity of the inner conductor mating contact element 11, equivalently arranged and shaped axially adjacent slot-shaped recesses 27 are formed in the insulator element 17 of the electrical mating plug connector 3. Lastly, slot-shaped recesses 15 in the inner conductor mating contact element 11 and slot-shaped recesses 27 in the insulator element 17 are each formed in an axial portion in which a clearance 28 is provided in the outer conductor mating contact element 12 of the mating plug connector.

Figure 4A:
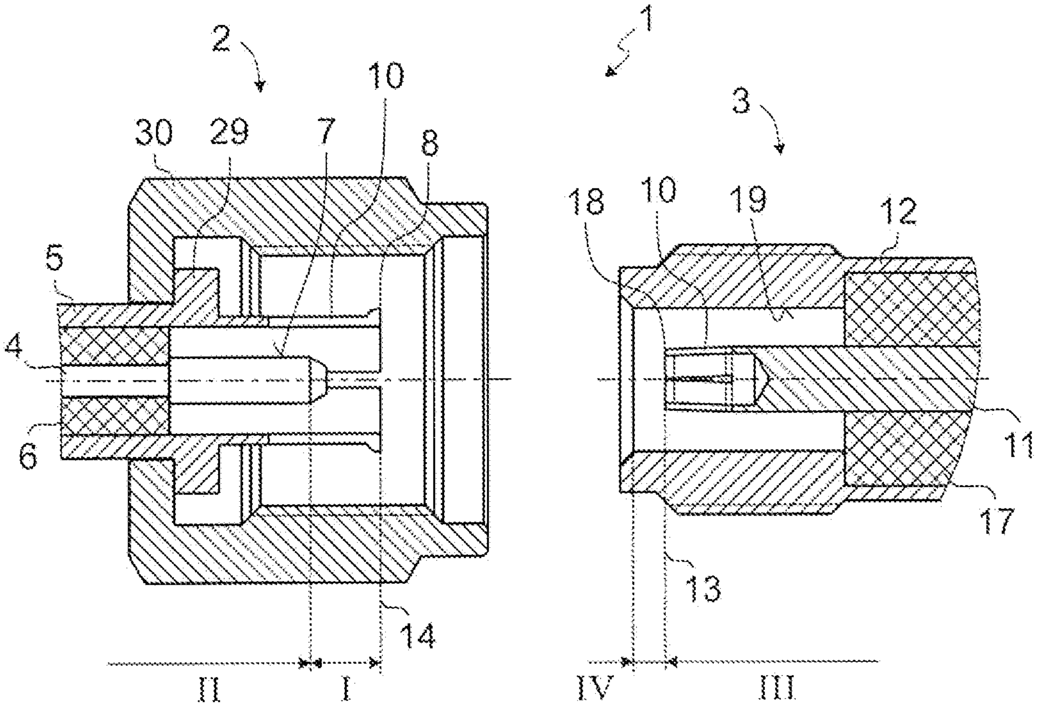
FIG. 4A shows a cross-sectional illustration of a third variant of the plug connection according to the invention in the unplugged state.
Figure 4B:
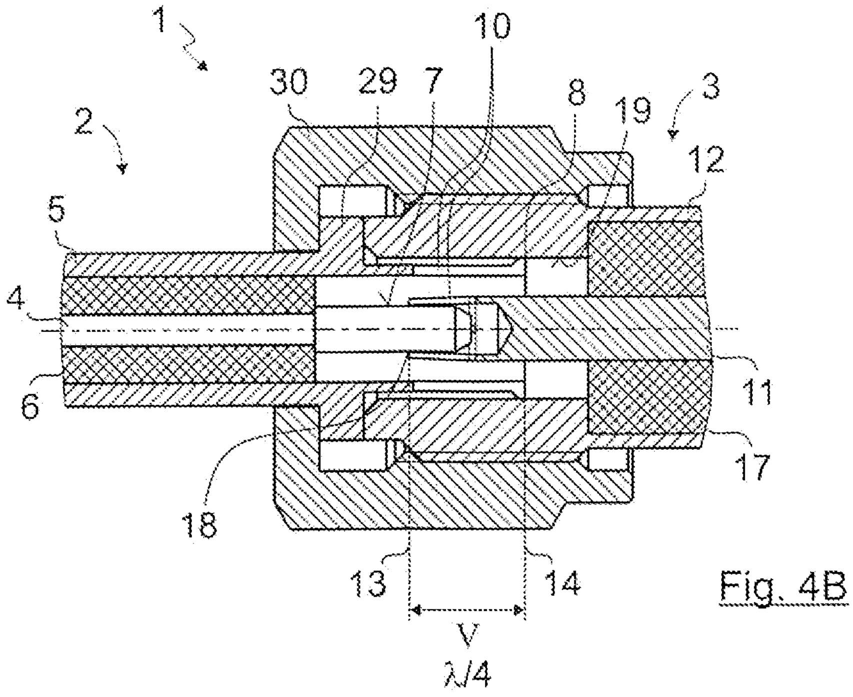
FIG. 4B shows a cross-sectional illustration of a third variant of the plug connection according to the invention in a second fully plugged state.

FIGS. 4A and 4B each show a third variant of a plug connection 1 which has no possibility for axial offset compensation. The axial spacing between the inner-conductor-side contact plane 13 and the outer-conductor-side contact plane 14, preferably amounting to a quarter of a wavelength λ/4 of the electrical signal to be transmitted, is realized by an additional axial fixing between the electrical plug connector 2 and the electrical mating plug connector 3.

In the plug connection of FIGS. 4A and 4B, axial fixing is achieved, for example, via an axial stop 29 formed in the outer conductor contact element 5, against which stop the outer conductor mating contact element 12 axially abuts in the plugged state, and a union nut 30. The union nut 30 is rotationally movably connected to the electrical plug connector 2 and can be screwed via an internal thread to an external thread formed on the outer conductor contact element 12. However, other technical solutions for an axial fixing between the electrical plug connector 2 and the electrical mating plug connector 3 are also conceivable, such as a latching between the plug connector housing and the mating plug connector housing.

In contrast to the first and second variants of the plug connection 1, the electrical plug connector 2 in the third variant has an inner conductor contact element 4 in the form of a pin with an inner-conductor-side contact region 7, and an outer conductor contact element 5 formed as a spring contact sleeve with an outer-conductor-side contact region 8, which forms an outer-conductor-side contact plane 14. Correspondingly, the electrical mating plug connector 3 has an inner conductor mating contact element 11 in the form of a spring contact sleeve with an inner-conductor-side mating contact region 18, which forms an inner-conductor-side contact plane 13, and an outer conductor mating contact element 12 in the form of a socket with an outer-conductor-side mating contact region 19. In the plugged state, the plug connection 1 is dimensioned such that the axial distance between the inner-conductor-side contact plane 13 and the outer-conductor-side contact plane 14 preferably corresponds to a quarter of a wavelength λ/4 of the electrical signal.

In the third variant of the plug connection, the wave impedance in the second axial longitudinal portion II of the electrical plug connector 2 corresponds to the wave impedance in the third axial longitudinal portion III of the electrical mating plug connector 3. The wave impedance in a fifth longitudinal portion V of the plug-in connection 1, which is located between the second axial longitudinal portion II and third axial longitudinal portion III in the plugged state of the plug-in connection 1, is different from the wave impedance in the second and in the third axial longitudinal portions II and III, in particular smaller than in the second and third axial longitudinal portions II and III.

Although the present invention has been fully described above with reference to preferred exemplary embodiments, it is not limited thereto, but can be modified in a variety of ways.

Operation

Having described the structure of my electrical plug connector, electrical mating plug connector, and electrical plug connection, its operation is briefly described.

A principal object of the present invention is an electrical plug connector (2) for electrical and mechanical connection to an electrical mating plug connector (3) that has an outer conductor mating contact element (12) and an inner conductor mating contact element (11), the electrical plug connector (2) comprising: an outer conductor contact element (5) that has an outer conductor side contact region (8); an outer conductor side contact plane (14) that is defined by the outer conductor side contact region (8) and which is transverse to a plug-in direction of the electrical plug connector (2); and wherein contact points of the outer conductor side contact region (8) span the outer conductor side contact plane (14), and the contact points of the outer conductor side contact region (8) contact a corresponding contact point of the outer conductor mating contact element (12) of the electrical mating plug connector (3) when the electrical plug connector (2) is connected to the electrical mating plug connector (3) in the plug-in direction; at least one inner conductor contact element (4) that has an inner conductor side contact region (7); an inner conductor side contact plane (13) that is defined by the inner conductor side contact region (7) and which is transverse to the plug-in direction of the electrical plug connector (2); contact points of the inner conductor side contact region (7) span the inner conductor side contact plane (13), and each of the contact points of the inner conductor side contact region (7) contacts a corresponding contact point of the inner conductor mating contact element (11) of the electrical mating plug connector (3) when the electrical plug connector (2) is connected to the electrical mating plug connector (3) in the plug-in direction; and the at least one inner conductor contact element (4) extends, at least in some portions, through the outer conductor contact element (5); and wherein the inner conductor side contact plane (13), and the outer conductor side contact plane (14), are spaced apart from one another in the plug-in direction; and in a plugged-in state of the electrical plug connector (2) and of the electrical mating plug connector (3), compensation of an electrical signal reflected in the inner conductor side contact plane (13) by an electrical signal reflected in the outer conductor side contact plane (14) is attainable.

A further object of the invention is an electrical plug connector (2) and wherein an axial distance between the inner-conductor-side contact plane (13) and the outer-conductor-side contact plane (14) lies in a range between 0.2 times and 0.3 times a wavelength of the electrical signal.

A further object of the invention is an electrical plug connector (2) and wherein the at least one inner conductor contact element (4) and the outer conductor contact element (5) are each formed as a radially contacting contact element.

A further object of the invention is an electrical plug connector (2) and wherein the at least one inner conductor contact element (4) and/or the outer conductor contact element (5) is an elastic contact element.

A further object of the invention is an electrical plug connector (2) and further comprising: an insulator element (25) which, in a plugged-in state of the electrical plug connector (2) and the mating electrical plug connector (3), at least partially fills a space defined between the outer conductor mating contact element (12) of the electrical mating plug connector (3) and the inner conductor contact element (4); and the at least one inner conductor contact element (4) extends, in a portion, between the inner-conductor-side contact plane (13) and the outer-conductor-side contact plane (14) and through the insulator element (25).

A further object of the invention is an electrical plug connector (2) and wherein a slot-shaped recess (15), is formed on the at least one inner conductor contact element (4) to compensate for a radial offset between the at least one inner conductor contact element (4) and the inner conductor mating contact element (11).

A further object of the invention is an electrical plug connector (2) and further comprising: a first axial longitudinal portion (I) of the electrical plug connector (2), and the first axial longitudinal portion (I) extends between the inner-conductor-side contact plane (13) and the outer-conductor-side contact plane (14); and a second axial longitudinal portion (II) of the electrical plug connector (2), which is axially adjacent to the first axial longitudinal portion (I); and the electrical plug connector (2) has a wave impedance which corresponds to a wave impedance in a third axial longitudinal portion (III).

A further object of the invention is an electrical mating plug connector (3) for electrical and mechanical connection to an electrical plug connector (2) that has an inner conductor contact element (4) and an outer conductor contact element (5), the electrical mating plug connector (3) comprising: an outer conductor mating contact element (12); and at least one inner conductor mating contact element (11) which extends, at least in some portions, through the outer conductor mating contact element (12), and wherein the at least one inner conductor mating contact element (11) has an inner-conductor-side mating contact region (18), and the outer conductor mating contact element (12) has an outer-conductor-side mating contact region (19); and wherein an inner-conductor-side contact plane (13) oriented transversely to a plug-in direction is spanned by contact points of the inner-conductor-side mating contact region (18) which are each set up to contact a corresponding contact point of the inner conductor contact element (4) of the electrical plug connector (2); and wherein an outer-conductor-side contact plane (14) that is oriented transversely to the plug-in direction is spanned by contact points of the outer-conductor-side mating contact region (19) which are each set up to contact a corresponding contact point of the outer-conductor contact element (5) of the electrical plug connector (2); and wherein the inner-conductor-side contact plane (13) and the outer-conductor-side contact plane (14) are spaced apart from one another in the plug-in direction in such a way that, in a plugged state of the electrical plug connector (2) and of the electrical mating plug connector (3), compensation of an electrical signal reflected in the inner-conductor-side contact plane (13) by an electrical signal reflected in the outer-conductor-side contact plane (14) is attainable.

A further object of the invention is an electrical mating plug connector (3) and wherein, an axial distance between the inner-conductor-side contact plane (13) and the outer-conductor-side contact plane (14) lies in a range between 0.2 times and 0.3 times a wavelength of the electrical signal.

A further object of the invention is an electrical mating plug connector (3) and wherein an axial distance between an outgoing-side end (20) of the inner-conductor-side mating contact region (18) and an outgoing-side end (21) of the outer-conductor-side mating contact region (19) is set up in such a way that, in a plugged state of the electrical plug connector (2) and of the electrical mating plug connector (3), compensation of an electrical signal reflected at the outgoing-side end (20) of the inner-conductor-side mating contact region (18) by an electrical signal reflected at the outgoing-side end (21) of the outer-conductor-side mating contact region (19) is attainable.

A further object of the invention is an electrical mating plug connector (3) and wherein an axial distance between a plug-side end (23), and the outgoing-side end (20), of the inner-conductor-side mating contact region (18) corresponds at least to a maximum axial offset between the electrical plug connector (2) and the electrical mating plug connector (3) realizable in an at least partly plugged state.

A further object of the invention is an electrical mating plug connector (3) and wherein an axial distance (L) between a plug-side end (22) of the outer-conductor-side mating contact region (19) and a plug-side end (23) of the inner-conductor-side mating contact region (18) is greater than an axial distance between the inner-conductor-side contact plane (13) and the outer-conductor-side contact plane (14) of the electrical plug connector (2).

A further object of the invention is an electrical mating plug connector (3) and further comprising: an insulator element (17) of the electrical mating plug connector (3), and the insulator element (17), at least partially fills, a space defined between the outer conductor mating contact element (12) and the inner conductor mating contact element (11), and along at least a portion of the inner-conductor-side mating contact region (18) in such a way that the inner conductor contact element (4) of the electrical plug connector (2) can be inserted between the insulator element (17) and the inner conductor mating contact element (11).

A further object of the invention is an electrical mating plug connector (3) and further comprising: a fourth axial longitudinal portion (IV) of the electrical mating plug connector (3) and the fourth axial longitudinal portion (IV) extends between the outgoing-side end (20) of the inner-conductor-side mating contact region (18) and the plug-side end (22) of the outer-conductor-side mating contact region (19); and a third axial longitudinal portion (III) of the electrical mating plug connector (3), which is axially adjacent to the fourth axial longitudinal portion (IV); and the electrical mating plug connector (3), in the third axial longitudinal portion (III), has a wave impedance which is set up to correspond to a wave impedance in a second axial longitudinal portion (11) of the electrical plug connector (2).

A further object of the invention is an electrical plug connection (1) comprising: an electrical plug connector (2) having, an outer conductor contact element (5) that has an outer conductor side contact region (8), an outer conductor side contact plane (14) that is defined by the outer conductor side contact region (8) and which is transverse to a plug-in direction of the electrical plug connector (2), and wherein contact points of the outer conductor side contact region (8) span the outer conductor side contact plane (14), and the contact points of the outer conductor side contact region (8) contacts a corresponding contact point of an outer conductor mating contact element (12) of an electrical mating plug connector (3) when the electrical plug connector (2) is connected to the electrical mating plug connector (3) in the plug-in direction, at least one inner conductor contact element (4) that has an inner conductor side contact region (7), an inner conductor side contact plane (13) that is defined by the inner conductor side contact region (7) and which is transverse to the plug-in direction of the electrical plug connector (2), contact points of the inner conductor side contact region (7) span the inner conductor side contact plane (13), and the contact points of the inner conductor side contact region (7) contact a corresponding contact point of an inner conductor mating contact element (11) of the electrical mating plug connector (3) when the electrical plug connector (2) is connected to the electrical mating plug connector (3) in the plug-in direction, and the at least one inner conductor contact element (4) extends, at least in some portions, through the outer conductor contact element (5), and wherein the inner conductor side contact plane (13), and the outer conductor side contact plane (14), are spaced apart from one another in the plug-in direction; and in a plugged-in state of the electrical plug connector (2) and of the electrical mating plug connector (3), compensation of an electrical signal reflected in the inner conductor side contact plane (13) by an electrical signal reflected in the outer conductor side contact plane (14) is attainable; and the electrical mating plug connector (3) having, the outer conductor mating contact element (12), and the at least one inner conductor mating contact element (11) which extends, at least in some portions, through the outer conductor mating contact element (12), and wherein the at least one inner conductor mating contact element (11) has an inner-conductor-side mating contact region (18), and the outer conductor mating contact element (12) has an outer-conductor-side mating contact region (19), and wherein an inner-conductor-side contact plane (13) oriented transversely to a plug-in direction is spanned by contact points of the inner-conductor-side mating contact region (18) which are each set up to contact a corresponding contact point of the inner conductor contact element (4) of the electrical plug connector (2), and wherein an outer-conductor-side contact plane (14) that is oriented transversely to the plug-in direction is spanned by contact points of the outer-conductor-side mating contact region (19) which are each set up to contact a corresponding contact point of the outer-conductor contact element (5) of the electrical plug connector (2), and wherein the inner-conductor-side contact plane (13) and the outer-conductor-side contact plane (14) are spaced apart from one another in the plug-in direction in such a way that, in a plugged state of the electrical plug connector (2) and of the electrical mating plug connector (3), compensation of an electrical signal reflected in the inner-conductor-side contact plane (13) by an electrical signal reflected in the outer-conductor-side contact plane (14) is attainable.

A further object of the invention is an electrical plug connector (2) and wherein an axial distance between the inner-conductor-side contact plane (13) and outer-conductor-side contact plane (14) is one quarter of a wavelength of the electrical signal.

A still further object of the invention is an electrical plug connector (2) and wherein the inner conductor contact element (4) and/or the outer conductor contact element (5) have at least two spring lugs (10), and the contact points of the at least two spring lugs (10) span the inner-conductor-side contact plane (13) or outer-conductor-side contact plane (14) respectively.

An even still further object of the invention is an electrical mating plug connector (3) and wherein, an axial distance between the inner-conductor-side contact plane (13) and the outer-conductor-side contact plane (14) corresponds to one quarter of a wavelength of the electrical signal.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An electrical plug connector for electrical and mechanical connection to an electrical mating plug connector that has an outer conductor mating contact element and an inner conductor mating contact element, the electrical plug connector comprising:

an outer conductor contact element that has an outer conductor side contact region;

an outer conductor side contact plane that is defined by the outer conductor side contact region and which is transverse to a plug-in direction of the electrical plug connector; and wherein contact points of the outer conductor side contact region span the outer conductor side contact plane, and the contact points of the outer conductor side contact region contact a corresponding contact point of the outer conductor mating contact element of the electrical mating plug connector when the electrical plug connector is connected to the electrical mating plug connector in the plug-in direction for communication of an electrical signal having a predetermined wavelength between the electrical plug connector and the mating electrical plug connector;

at least one inner conductor contact element that has an inner conductor side contact region;

an inner conductor side contact plane that is defined by the inner conductor side contact region and which is transverse to the plug-in direction of the electrical plug connector;

contact points of the inner conductor side contact region span the inner conductor side contact plane, and each of the contact points of the inner conductor side contact region contacts a corresponding contact point of the inner conductor mating contact element of the electrical mating plug connector when the electrical plug connector is connected to the electrical mating plug connector in the plug-in direction for communication of an electrical signal having a predetermined wavelength between the electrical plug connector and the mating electrical plug connector; and the at least one inner conductor contact element extends, at least in some portions, through the outer conductor contact element; and wherein the inner conductor side contact plane, and the outer conductor side contact plane, are spaced apart from one another in the plug-in direction; and in a plugged-in state of the electrical plug connector and of the electrical mating plug connector, compensation of an electrical signal reflected in the inner conductor side contact plane by an electrical signal reflected in the outer conductor side contact plane is attainable; and wherein a slot-shaped recess, is formed on the at least one inner conductor contact element to compensate for a radial offset between the at least one inner conductor contact element and the inner conductor mating contact element.

2. The electrical plug connector as claimed in claim 1 and wherein at least one inner conductor contact element and the outer conductor contact element are each formed as a radially contacting contact element.

3. The electrical plug connector as claimed in claim 1 and wherein the at least one inner conductor contact element and/or the outer conductor contact element are an elastic contact element.

4. The electrical plug connector as claimed in claim 1 and further comprising:

an insulator element which, in a plugged-in state of the electrical plug connector and the mating electrical plug connector, at least partially fills a space defined between the outer conductor mating contact element of the electrical mating plug connector and the inner conductor contact element; and the at least one inner conductor contact element extends, in a portion, between the inner-conductor-side contact plane and the outer-conductor-side contact plane and through the insulator element.

5. The electrical plug connector as claimed in claim 1 and further comprising:

a first axial longitudinal portion (I) of the electrical plug connector, and the first axial longitudinal portion (I) extends between the inner-conductor-side contact plane and the outer-conductor-side contact plane; and a second axial longitudinal portion (II) of the electrical plug connector, which is axially adjacent to the first axial longitudinal portion (I); and the electrical plug connector has a wave Impedance which corresponds to a wave impedance in a third axial longitudinal portion (III).

6. The electrical plug connector as claimed in claim 1 and wherein an axial distance between the inner-conductor-side contact plane and outer-conductor-side contact plane is one quarter of a wavelength of the electrical signal.

7. An electrical plug connection comprising:

an electrical mating plug connector; and an electrical plug connector having, an outer conductor contact element that has an outer conductor side contact region, an outer conductor side contact plane that is defined by the outer conductor side contact region and which is transverse to a plug-in direction of the electrical plug connector, and wherein contact points of the outer conductor side contact region span the outer conductor side contact plane, and the contact points of the outer conductor side contact region contacts a corresponding contact point of an outer conductor mating contact element of the electrical mating plug connector when the electrical plug connector is connected to the electrical mating plug connector in the plug-in direction, at least one inner conductor contact element that has an inner conductor side contact region, an inner conductor side contact plane that is defined by the inner conductor side contact region and which is transverse to the plug-in direction of the electrical plug connector, contact points of the inner conductor side contact region span the inner conductor side contact plane, and the contact points of the inner conductor side contact region contact a corresponding contact point of an inner conductor mating contact element of the electrical mating plug connector when the electrical plug connector is connected to the electrical mating plug connector in the plug-in direction, and the at least one inner conductor contact element extends, at least in some portions, through the outer conductor contact element, and wherein the inner conductor side contact plane, and the outer conductor side contact plane, are spaced apart from one another in the plug-in direction; and in a plugged-in state of the electrical plug connector and of the electrical mating plug connector, compensation of an electrical signal reflected in the inner conductor side contact plane by an electrical signal reflected in the outer conductor side contact plane is attainable; and the electrical mating plug connector having, the outer conductor mating contact element, and the at least one inner conductor mating contact element which extends, at least in some portions, through the outer conductor mating contact element, and wherein the at least one inner conductor mating contact element has an inner-conductor-side mating contact region, and the outer conductor mating contact element has an outer-conductor-side mating contact region, and wherein an inner-conductor-side contact plane oriented transversely to a plug-in direction is spanned by contact points of the inner-conductor-side mating contact region which are each set up to contact a corresponding contact point of the inner conductor contact element of the electrical plug connector, and wherein an outer-conductor-side contact plane that is oriented transversely to the plug-in direction is spanned by contact points of the outer-conductor-side mating contact region which are each set up to contact a corresponding contact point of the outer-conductor contact element of the electrical plug connector, and wherein the inner-conductor-side contact plane and the outer-conductor-side contact plane are spaced apart from one another in the plug-in direction in such a way that, in a plugged state of the electrical plug connector and of the electrical mating plug connector, compensation of an electrical signal reflected in the inner-conductor-side contact plane by an electrical signal reflected in the outer-conductor-side contact plane is attainable.

8. An electrical plug connector for electrical and mechanical connection to an electrical mating plug connector that has an outer conductor mating contact element and an inner conductor mating contact element, the electrical plug connector comprising:

an outer conductor contact element that has an outer conductor side contact region;

an outer conductor side contact plane that is defined by the outer conductor side contact region and which is transverse to a plug-in direction of the electrical plug connector; and wherein contact points of the outer conductor side contact region span the outer conductor side contact plane, and the contact points of the outer conductor side contact region contact a corresponding contact point of the outer conductor mating contact element of the electrical mating plug connector when the electrical plug connector is connected to the electrical mating plug connector in the plug-in direction for communication of an electrical signal having a predetermined wavelength between the electrical plug connector and the mating electrical plug connector;

at least one inner conductor contact element that has an inner conductor side contact region;

an inner conductor side contact plane that is defined by the inner conductor side contact region and which is transverse to the plug-in direction of the electrical plug connector;

contact points of the inner conductor side contact region span the inner conductor side contact plane, and each of the contact points of the inner conductor side contact region contacts a corresponding contact point of the inner conductor mating contact element of the electrical mating plug connector when the electrical plug connector is connected to the electrical mating plug connector in the plug-in direction for communication of an electrical signal having a predetermined wavelength between the electrical plug connector and the mating electrical plug connector; and the at least one inner conductor contact element extends, at least in some portions, through the outer conductor contact element; and wherein the inner conductor side contact plane, and the outer conductor side contact plane, are spaced apart from one another in the plug-in direction; and in a plugged-in state of the electrical plug connector and of the electrical mating plug connector, compensation of an electrical signal reflected in the inner conductor side contact plane by an electrical signal reflected in the outer conductor side contact plane is attainable; and wherein the inner conductor contact element and/or the outer conductor contact element have at least two spring lugs, and the contact points of the at least two spring lugs span the inner-conductor-side contact plane or outer-conductor-side contact plane respectively.

* * * * *